JOHN MACOMB. Elevator.
No. 118,468. 2 Sheets--Sheet 2.
Patented Aug. 29, 1871.
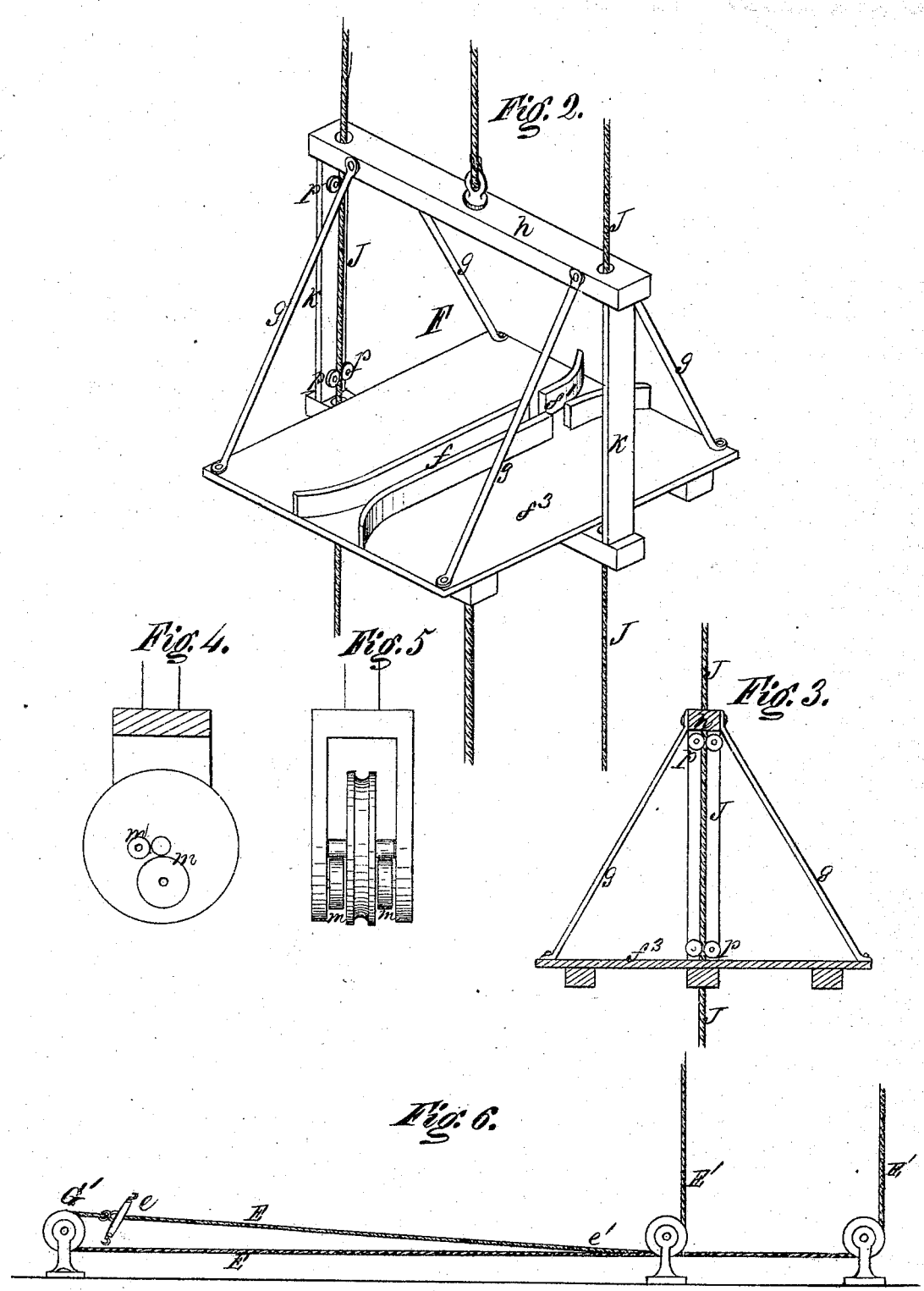

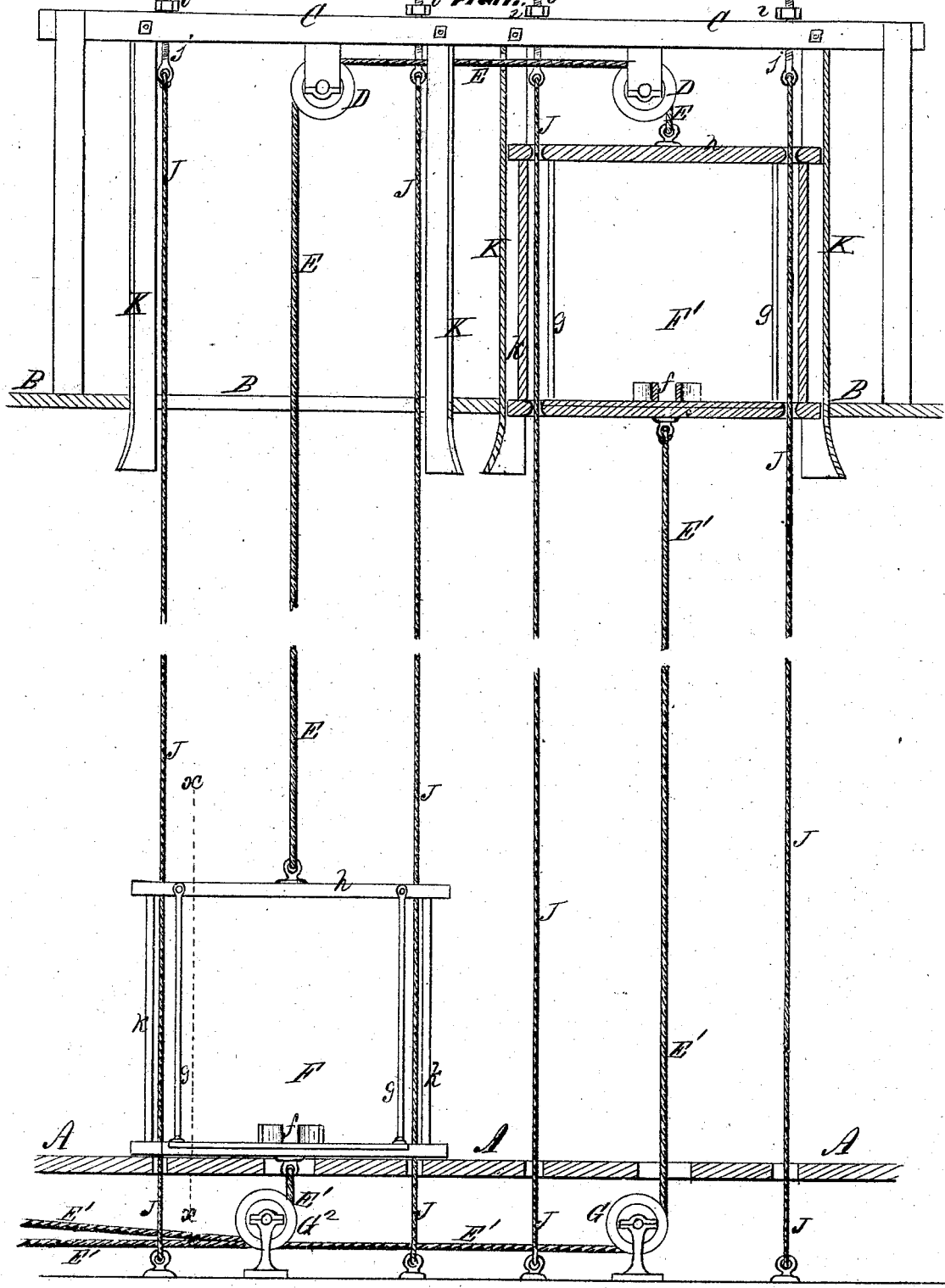

UNITED STATES PATENT OFFICE.

JOHN MACOMB, OF CHICAGO, ILLINOIS.

IMPROVEMENT IN ELEVATORS.

Specification forming part of Letters Patent No. 118,468, dated August 29, 1871.

*To all whom it may concern:*

Be it known that I, JOHN MACOMB, of the city of Chicago, in the county of Cook and State of Illinois, have invented certain new and useful Improvements in Elevators, of which the following is a specification:

My invention consists in the employment of vertical guide-ropes, rods, or chains, for the purpose of controlling the action of the platforms; second, in hanging the latter centrally to the hoisting-rope or chain, and so that the opposite platforms counterbalance each other; third, in providing the pulley-blocks and the platforms with anti-friction rollers; and, lastly, in the employment of guide-boxes or ways, all in the manner and for the purpose hereinafter described.

In the drawing, Figure 1 is a sectional elevation of my elevator in use; Fig. 2, a detached perspective view of a platform; Fig. 3, a cross-section of the same in plane of line $x\ x$, Fig. 1; Figs. 4 and 5, respectively, a section and end elevation of one of the pulley-blocks enlarged; Fig. 6, a diagram illustrating the application of horse-power to the elevator.

In Fig. 1, A represents the lower, and B one of the upper stories of a building under construction. A suitable frame-work or support, C, is provided at the upper story B, from which are hung two or more pulleys, D D, which receive and sustain the supporting-rope or chain E, to which the platforms F F' (the latter F' being shown in cross-section in Fig. 1) are centrally hung. A driving-rope or chain, E', is secured to and extends downward from the under side of the platform F', for instance, and passing around pulley G, extends outward horizontally and around the pulley G¹, as shown in diagram, Fig. 6; from thence it returns and passes upward around the pulley G², and is secured to the under side of the platform F, the whole system of supporting and driving-ropes or chains E E' thus virtually forming an endless belt, with the platforms between forming the connecting-links between the two sections E E'. The pulleys D D G G¹ G² are provided with anti-friction rollers $m$ $m$, as shown in Figs. 4 and 5. Guide-ropes, rods, or chains J J are secured at the lower story, passing up vertically, and being secured to the support C preferably by means of threaded rods $j$, secured by nuts $i$ on top, so that the guides may be tightened and adjusted by the turning of the nut. The platforms F F' are guided and prevented from turning in their ascent and descent by these guides J J, which pass through the platform, or are embraced by suitable arms or forks of the latter. Anti-friction rollers or grooved pulleys $p\ p$ are also suitably situated upon the platforms, (similar to the manner shown in Figs. 2 and 3,) bearing against the guides. Two guides, J J, are preferably provided for each platform, although one, or three, four, or more may be used, if desired, the principle being the same in either case. The platforms are provided with guides or ways $f$ for the reception of the wheel of the barrow, a cross-slot or recess, $f^1$, being left open, into which the cross-bar between the barrow-legs drops to hold the barrow in place. The form of the frame and braces of the platforms may be altered, if desired, to suit circumstances. They are intended to be so hung in relation to each other that when one is at the lowest point the other is always at the highest point. Guide-boxes or ways K K are arranged at the upper story, which receive and direct suitable projections of the platform when it has reached the proper height, and act to hold and steady it while the load is being removed or applied.

The operation is as follows: One platform will always be at the highest point of ascent or place of discharge, while the other platform is at the limit of descent or the place at which the load is received. At starting the platforms are brought into the relative position just described, and a loaded wheelbarrow, for example, is rolled upon the lower platform F, the wheel entering the guide-way $f$, and the cross-piece between the legs resting in the brake-opening $f^1$. The horse having been hitched to the rope E', say at the point $e$, Fig. 6, is then started forward, and the strain of his pulling is communicated by the rope directly to the platform F' at the highest elevation, drawing it downward and at the same time producing an equal upward movement upon the opposite platform by means of their connection through the cord E. This movement continues until the platforms have reached opposite extremities of position, which will require the horse to advance the whiffletree from the point $e$ to the limit of movement at $e'$. The guide-boxes or ways K K receive the projections of the ascending platform, guiding it into position with accuracy, and holding it firmly while the loaded barrow is being wheeled off, and, the lower platform at the same time having been supplied with its load, all is again ready for operation. While the load is being placed in one and taken off the other platform, I contemplate holding the platforms stationary by means of an automatic catch, which is disconnected when all is ready, and the horse in the mean time having been turned about, he is made to pull in the opposite direction over the ground upon which he had just advanced. This movement will elevate the loaded platform and bring down the other into the position occupied at the beginning of the description.

Instead of a horse, an engine or windlass may be employed, which would simply require that the rope E be made to take several turns about the barrel of the windlass and the motion of the crank reversed at every movement. The platforms, in performing the upward and downward movements, are kept perfectly steady and true by the guidance of the cords, chains, or rods J J passing between the pulleys $p\ p$ in the frame of the platform.

The advantages secured by my device are valuable. It is intended to supplement my brick-and-mortar elevator, designed for constructing large buildings, and which has been secured to me by a former patent; and it does this by affording a very simple, cheap, and effective arrangement for use in a smaller class of buildings, where the other elevator would be too expensive or cumbersome. The platforms being so arranged that the weight of one balances that of the other, it is necessary only to raise the weight of the load placed upon either. The guide-rods, ropes, or chains are found to be of great value and importance by preventing any swinging motion, which is a cause of severe additional strain on the parts of an elevator where it is permitted, and is besides a source of much irregularity and dissatisfaction in working the device. The guide-boxes or ways provided at the upper story are found to be an excellent feature, as they steady and hold the platform while it is being loaded or unloaded, obviating all undue strain on the guide-ropes or cords, and insuring a smooth and uniform action throughout. When the elevator is so situated as to be conveniently moved by horse-power, the saving of time and trouble is to be noticed in the fact that it is not necessary to back the horse each time that a movement of the platforms is made, to the point of starting, but he is simply turned about and made to pull both ways over the course. The arrangement of the pulleys on anti-friction rollers, and of the guide-ropes, chains, or rods running between anti-friction rollers or pulleys arranged upon the frames of the platforms, insures a smooth and easy operation of the machine and reduces the friction to the minimum degree. The parts are all so made as to admit of being easily erected in any building and readily adjusted to the height of different floors in the same building. The elevator is adapted not only to building purposes, but also for permanent fixture in buildings for the purpose of elevating goods, &c.

What I claim as my invention, and desire to secure by Letters Patent, is—

1. The platforms F F', hung centrally to the rope or chains E E', in combination with guide-ropes, rods, or chains J J, constructed and arranged as and for the purpose specified.

2. One or more guide-ropes, rods, or chains, J J, when employed for the purpose specified, and arranged substantially as shown.

3. The guide-ways K K, arranged and operating with the platforms F F', for the purpose specified.

4. The elevator-platform, provided with a guide-way, $f$, having an opening, $f^1$, for the purpose specified.

5. The construction of the platforms F F' with the central cross-beam $h$, to which the platform-floor $f^3$ is hung by means of braces $g\ g$ and vertical support $k$, arrranged substantially as and for the purpose herein set forth.

6. The threaded rods $j\ j$ and nuts $i\ i$, in combination with the platforms F F', guide-ropes, chains, or rods J J, constructed and arranged for the purpose described.

7. The anti-friction rollers or pulleys $m\ m$, in combination with the pulleys D D G $G^1$ $G^2$, arranged as shown and described, and for the purpose set forth.

8. The arrangement of the pulleys G $G^1$ $G^2$ so as to admit of the horse's pulling in both directions, as herein described, in combination with the rope or chain E', for the purpose specified.

9. The anti-friction rollers or pulleys $p\ p$, arranged upon the platforms F F', in combination with the guides J J, for the purpose set forth.

10. The elevating device as a whole, consisting of the platforms F F', the guides J J, the arrangement of the cords E E, pulleys D D G $G^1$ $G^2$, and guide-boxes K K, all substantially in the manner described and shown.

In witness whereof I have hereunto signed my name in the presence of two subscribing witnesses.

JOHN MACOMB.

Witnesses:
J. B. GRIFENHAGEN.
GEO. W. MIATT.